(12) United States Patent
Minamino

(10) Patent No.: US 8,121,441 B2
(45) Date of Patent: Feb. 21, 2012

(54) IMAGE PROCESSING APPARATUS, IMAGE SCANNING APPARATUS, IMAGE PROCESSING METHOD, AND IMAGE PROCESSING PROGRAM

(75) Inventor: Katsushi Minamino, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 827 days.

(21) Appl. No.: 12/211,157

(22) Filed: Sep. 16, 2008

(65) Prior Publication Data

US 2009/0110328 A1   Apr. 30, 2009

(30) Foreign Application Priority Data

Oct. 26, 2007 (JP) ................................. 2007-278880
Apr. 23, 2008 (JP) ................................. 2008-112510

(51) Int. Cl.
*G06K 9/00* (2006.01)
*G06K 9/03* (2006.01)
*G06K 9/32* (2006.01)
*H04N 1/04* (2006.01)
*H04N 1/387* (2006.01)

(52) U.S. Cl. ........ 382/321; 382/112; 382/176; 382/293; 382/296; 382/300; 382/301; 358/474; 358/488

(58) Field of Classification Search ................... 382/321, 382/115, 176, 293, 296, 300, 301; 358/474, 358/488
See application file for complete search history.

(56) References Cited

U.S. PATENT DOCUMENTS

| | | | | |
|---|---|---|---|---|
| 4,637,057 A | * | 1/1987 | Kermisch | 382/296 |
| 4,829,452 A | * | 5/1989 | Kang et al. | 345/657 |
| 4,850,028 A | * | 7/1989 | Kawamura et al. | 382/296 |
| 5,581,635 A | * | 12/1996 | Zhu et al. | 382/245 |
| 5,854,854 A | * | 12/1998 | Cullen et al. | 382/176 |
| 7,411,593 B2 | * | 8/2008 | Prakash et al. | 345/611 |
| 7,991,197 B2 | * | 8/2011 | Natori | 382/112 |

FOREIGN PATENT DOCUMENTS

JP   06-068245 A   3/1994

OTHER PUBLICATIONS

Aguin et al., "Computer Image Processing and Recognition," Shokodo, Oct. 20, 2000, pp. 20-24.

* cited by examiner

*Primary Examiner* — Michael A Newman

(74) *Attorney, Agent, or Firm* — Keating & Bennett, LLP

(57) ABSTRACT

A method and system for correcting the inclination of a scanned document in which two integers "a" and "b" are input to perform a rotation process. Each time an x-coordinate of a target pixel of a rotated image is changed by one pixel, "a" is added to a factor "kwy". When "kwy" becomes more than or equal to "b", "b" is subtracted from "kwy", and a y-coordinate of a corresponding target pixel of an original image is changed by one pixel. Each time a y-coordinate of the target pixel is changed by one pixel, "a" is added to a factor "kwx". When "kwx" becomes more than or equal to "b", "b" is subtracted from "kwx", and an x-coordinate of the corresponding target pixel of the original image is changed by one pixel. Four pixels including the corresponding target pixel are used to acquire a pixel value of the target pixel by two-dimensional interpolation by ratios acquired by dividing "kwx" and "kwy" respectively by "b".

12 Claims, 8 Drawing Sheets

FIG. 1
PRIOR ART $$\begin{bmatrix} x^* \\ y^* \end{bmatrix} = \begin{bmatrix} \cos\theta & -\sin\theta \\ \sin\theta & \cos\theta \end{bmatrix} \begin{bmatrix} x \\ y \end{bmatrix}$$

$a:b = dy:dx$

MAIN SCANNING DIRECTION

SUB SCANNING DIRECTION

FIG. 6
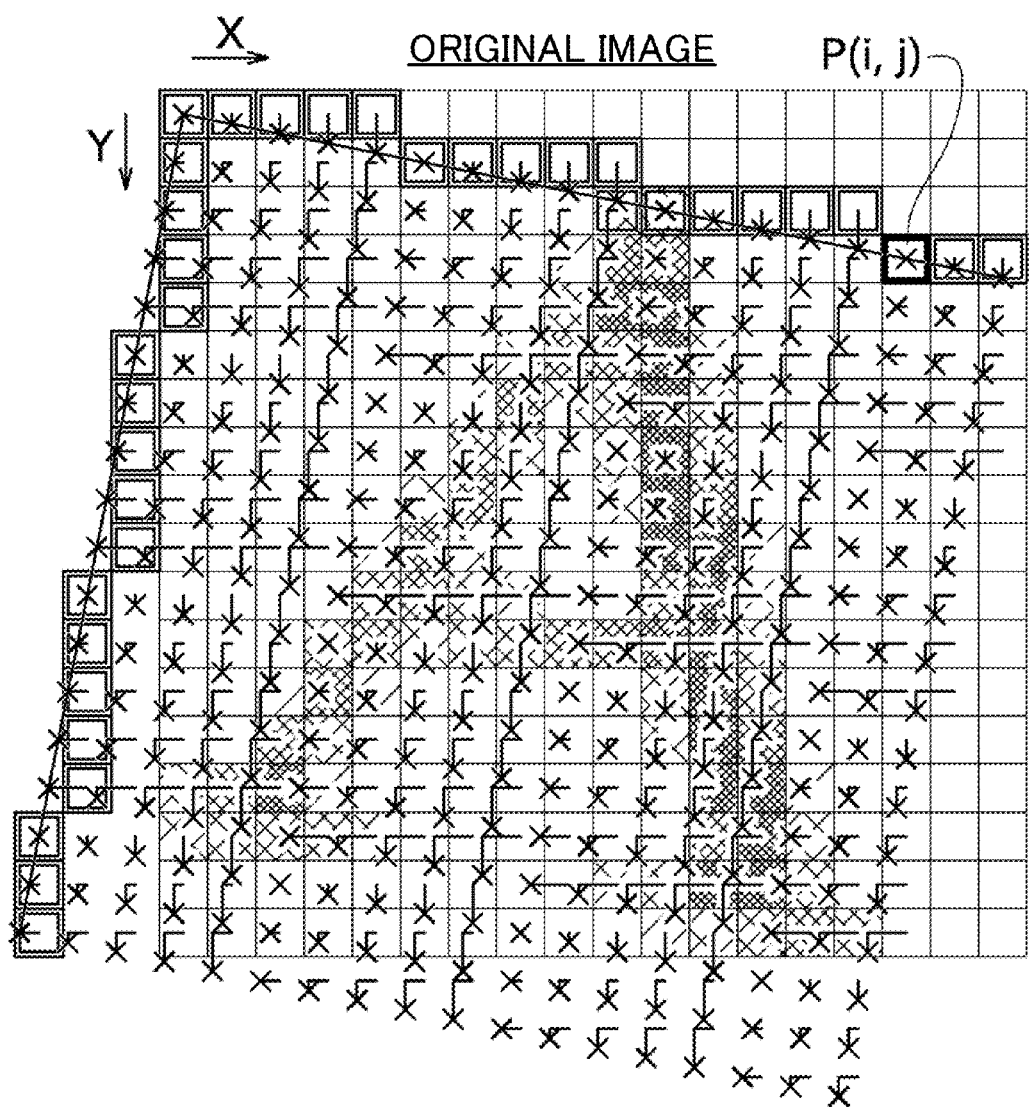
ORIGINAL IMAGE  P(i, j)
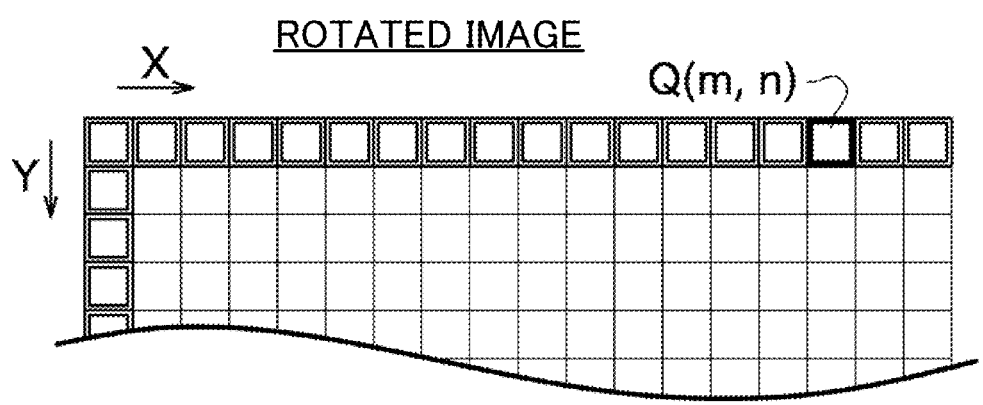
ROTATED IMAGE  Q(m, n)

FIG. 7
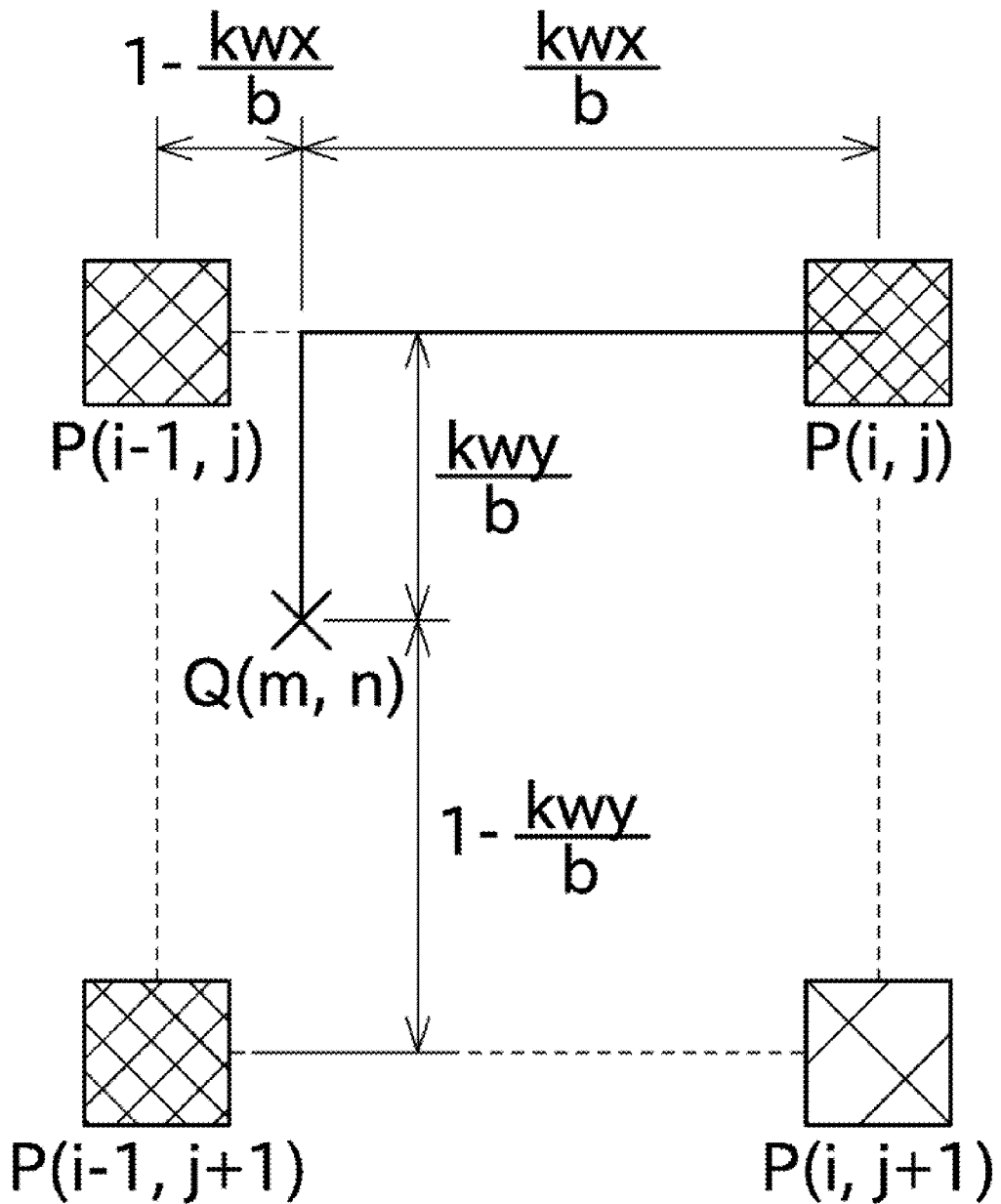
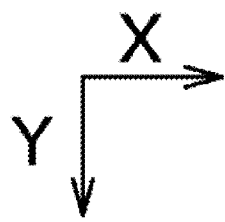

FIG. 8
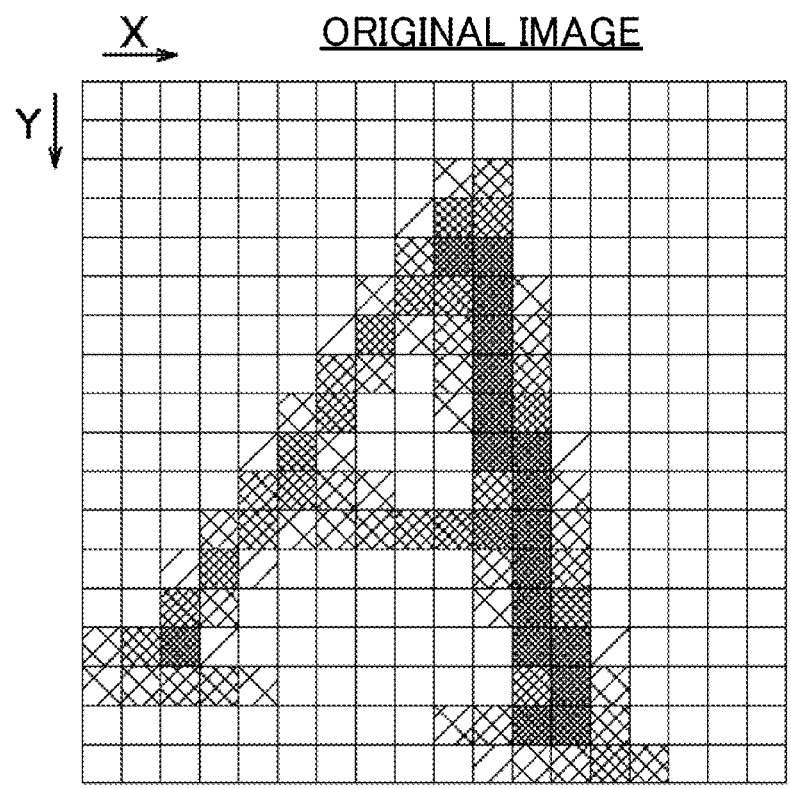
ORIGINAL IMAGE
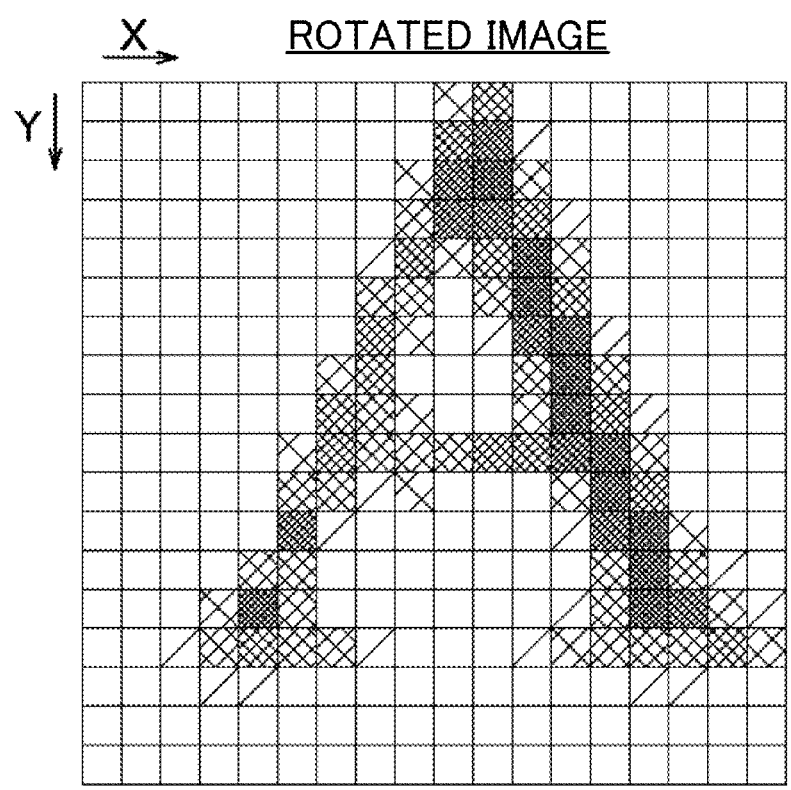
ROTATED IMAGE

IMAGE PROCESSING APPARATUS, IMAGE SCANNING APPARATUS, IMAGE PROCESSING METHOD, AND IMAGE PROCESSING PROGRAM

CROSS-REFERENCE TO RELATED APPLICATION

This application claims priority under 35 U.S.C. 119 to Japanese Patent Applications No. 2007-278880, filed on Oct. 26, 2007, and No. 2008-112510, filed on Apr. 23, 2008, which applications are hereby incorporated by reference in their entirety.

BACKGROUND OF THE INVENTION

1. Field of the Invention

The present invention primarily relates to an image processing apparatus that performs a process of rotating image data.

2. Description of the Related Art

In an image scanner apparatus, a copier, a facsimile machine, and an Optical Character Reader (OCR), or the like, when an original document is scanned in an inclined state, an inclined image is acquired, thereby deteriorating the scanning quality. In order to prevent such a deterioration, an image scanning apparatus that can electronically correct the inclination by performing a process of rotating image data has been disclosed.

It is commonly known that such an image rotating process uses a rotation matrix. Assuming that the coordinates of an arbitrary pixel of an original image is (x, y), and the coordinates of a corresponding pixel of a converted image is (x*, y*), for example, it is known that an image is rotated by using a formula represented in FIG. 1. Moreover, it is known that in a geometric correction process of an image including the above-described rotating process, a tone value (pixel value) of an intermediate pixel can be acquired by performing a two-dimensional interpolation process.

However, in such a method, multiplication of "sin θ" and "cos θ", which are normally a surd, is performed with respect to each pixel, thereby substantially increasing the cost and time of calculations. Accordingly, a considerably long period of time is required for such an image rotating process, and when the process is applied to inclination correction of an image scanning apparatus, high-speed scanning cannot be easily performed.

SUMMARY OF THE INVENTION

Accordingly, an image processing apparatus capable of performing an image rotating process in a short period of time is desired but has not been developed previously. In order to overcome the problems described above, preferred embodiments and advantages of the present invention are described below.

According to a first preferred embodiment of the present invention, an image processing apparatus capable of acquiring a rotated image by rotating a raster image, which corresponds to an original image, includes an integer parameter input unit, an original image corresponding position calculating unit, and a two-dimensional interpolation unit. A first integer parameter and a second integer parameter of which a ratio value equals a tangent value of a rotation angle are input into the integer parameter input unit. Each time an x-coordinate of a target pixel of the rotated image is changed by prescribed pixels, the original image corresponding position calculating unit adds the first integer parameter to a y-direction weighting factor. Then, when the y-direction weighting factor becomes more than or equal to the second integer parameter, the original image corresponding position calculating unit subtracts the second integer parameter from the y-direction weighting factor, and performs a process of changing by prescribed pixels a y-coordinate of a corresponding target pixel, which corresponds to the target pixel in the original image. Moreover, each time a y-coordinate of the target pixel of the rotated image is changed by prescribed pixels, the original image corresponding position calculating unit adds the first integer parameter to an x-direction weighting factor, and when the x-direction weighting factor becomes more than or equal to the second integer parameter, the original image corresponding position calculating unit subtracts the second integer parameter from the x-direction weighting factor, and performs a process of changing an x-coordinate of the corresponding target pixel of the original image by prescribed pixels. With respect to the corresponding target pixel of the original image and to three pixels each having at least one of the x-coordinate and the y-coordinate that are different by prescribed pixels from the corresponding target pixel, the two-dimensional interpolation unit performs two-dimensional interpolation by a ratio acquired by dividing the x-direction weighting factor by the second integer parameter and a ratio acquired by dividing the y-direction weighting factor by the second integer parameter so as to acquire a pixel value of the target pixel of the rotated image.

In the above-described configuration, by performing an integer calculating process and an integer comparison process using the two integer parameters and the weighting factors, the rotating process including the two-dimensional interpolation can be performed. Accordingly, processes that require a substantial cost and time of calculations such as a floating-point calculation can be reduced, and a high-quality rotated image can be acquired at high speed.

In the image processing apparatus, the two-dimensional interpolation unit can collectively perform the division by a square of the second integer parameter in the calculation of the pixel value of the target pixel.

In the above-described configuration, since the division process, which requires a substantial cost and time of calculations, can be reduced, the rotating process can be performed at a higher speed.

In the image processing apparatus, the two-dimensional interpolation unit changes the second integer parameter to a value of two to the power of the integer (a value acquired by calculating two to the integer power). Further, it is preferable to calculate the pixel value of the target pixel after multiplying the x-direction weighting factor and the y-direction weighting factor by a ratio acquired by dividing the value of two to the power of the integer by the not-yet changed second integer parameter, so as to approximate an integer value.

In the above-described configuration, since the calculation cost and time of the division process can be substantially reduced, the rotating process can be performed at a higher speed.

According to a second preferred embodiment of the present invention, an image scanning apparatus includes an image processing apparatus, an image scanning unit arranged to acquire image data by scanning an image of an original document, and an inclination angle detecting unit arranged to acquire, from the coordinates of two points in the image data, two inclination integer parameters of which a ratio value equals a tangent value of an inclination angle of the original document. By providing the image processing apparatus with the two inclination integer parameters as a first integer parameter and a second integer parameter, and by rotating the image data, the image scanning apparatus can acquire image data having the corrected inclination of the original document.

In the above-described configuration, the image data having the corrected inclination can be acquired in a short period of time, which is particularly preferable for high-speed scanning.

A third preferred embodiment of the present invention provides an image processing method in which, based on a first integer parameter and a second integer parameter of which a ratio value equals a tangent value of a rotation angle, the image processing method acquires a rotated image by rotating a raster image, which corresponds to an original image. The image processing method includes an original image corresponding position calculating step and a two-dimensional interpolation step. In the original image corresponding position calculating step, each time an x-coordinate of a target pixel of the rotated image is changed by prescribed pixels, the first integer parameter is added to a y-direction weighting factor, and when the y-direction weighting factor becomes more than or equal to the second integer parameter, the second integer parameter is subtracted from the y-direction weighting factor, and a y-coordinate of a corresponding target pixel, which corresponds to the target pixel in the original image, is changed by prescribed pixels. In the original image corresponding position calculating step, each time a y-coordinate of the target pixel of the rotated image is changed by prescribed pixels, the first integer parameter is added to an x-direction weighting factor, and when the x-direction weighting factor becomes more than or equal to the second integer parameter, the second integer parameter is subtracted from the x-direction weighting factor, and an x-coordinate of the corresponding target pixel of the original image is changed by prescribed pixels. In the two-dimensional interpolation step, with respect to the corresponding target pixel of the original image and three pixels each having at least one of the x-coordinate and y-coordinate that are different by prescribed pixels from the corresponding target pixel, by performing two-dimensional interpolation by a ratio acquired by dividing the x-direction weighting factor by the second integer parameter and a ratio acquired by dividing the y-direction weighting factor by the second integer parameter, a pixel value of the target pixel of the rotated image is acquired.

In the above-described method, by performing an integer calculation process and an integer comparison process using the two integer parameters and the weighting factors, the rotating process including the two-dimensional interpolation can be performed. Accordingly, processes that require a substantial calculation cost and time, such as a floating-point calculation, can be reduced, and a high-quality rotated image can be acquired at a high speed.

A fourth preferred embodiment of the present invention provides an image processing program that acquires a rotated image by rotating a raster image, which corresponds to an original image. The image processing program executes an integer parameter inputting step, an original image corresponding position calculating step, and a two-dimensional interpolation step. In the integer parameter inputting step, a first integer parameter and a second integer parameter of which a ratio value equals to a tangent value of a rotation angle are input. In the original image corresponding position calculating step, each time an x-coordinate of a target pixel of the rotated image is changed by prescribed pixels, the first integer parameter is added to a y-direction weighting factor, and when the y-direction weighting factor becomes more than or equal to the second integer parameter, the second integer parameter is subtracted from the y-direction weighting factor, and a y-coordinate of a corresponding target pixel, which corresponds in the original image to the target pixel, is changed by prescribed pixels. In the original image corresponding position calculating step, each time a y-coordinate of the target pixel of the rotated image is changed by prescribed pixels, the first integer parameter is added to an x-direction weighting factor, and when the x-direction weighting factor becomes more than or equal to the second integer parameter, the second integer parameter is subtracted from the x-direction weighting factor, and an x-coordinate of the corresponding target pixel of the original image is changed by prescribed pixels. In the two-dimensional interpolation step, with respect to the corresponding target pixel of the original image and to three pixels each having at least one of the x-coordinate and the y-coordinate that are different by prescribed pixels from the corresponding target pixel, by performing two-dimensional interpolation by a ratio acquired by dividing the x-direction weighting factor by the second integer parameter and a ratio acquired by dividing the y-direction weighting factor by the second integer parameter, a pixel value of the target pixel of the rotated image is acquired.

Thus, by performing an integer calculation process and an integer comparison process using the two integer parameters and the weighting factors, the rotating process including the two-dimensional interpolation can be performed. Accordingly, processes that require a substantial calculation cost and time, such as a floating-point calculation, can be reduced, and a high-quality rotated image can be acquired at a high speed.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 1 represents a conventional coordinate conversion formula used when an image is rotated.

FIG. 6 simply represents the rotation process.

FIG. 7 is a schematic diagram illustrating a two-dimensional interpolation process.

FIG. 8 illustrates an original image and a rotation result thereof.

DETAILED DESCRIPTION OF PREFERRED EMBODIMENTS

Figure 2:
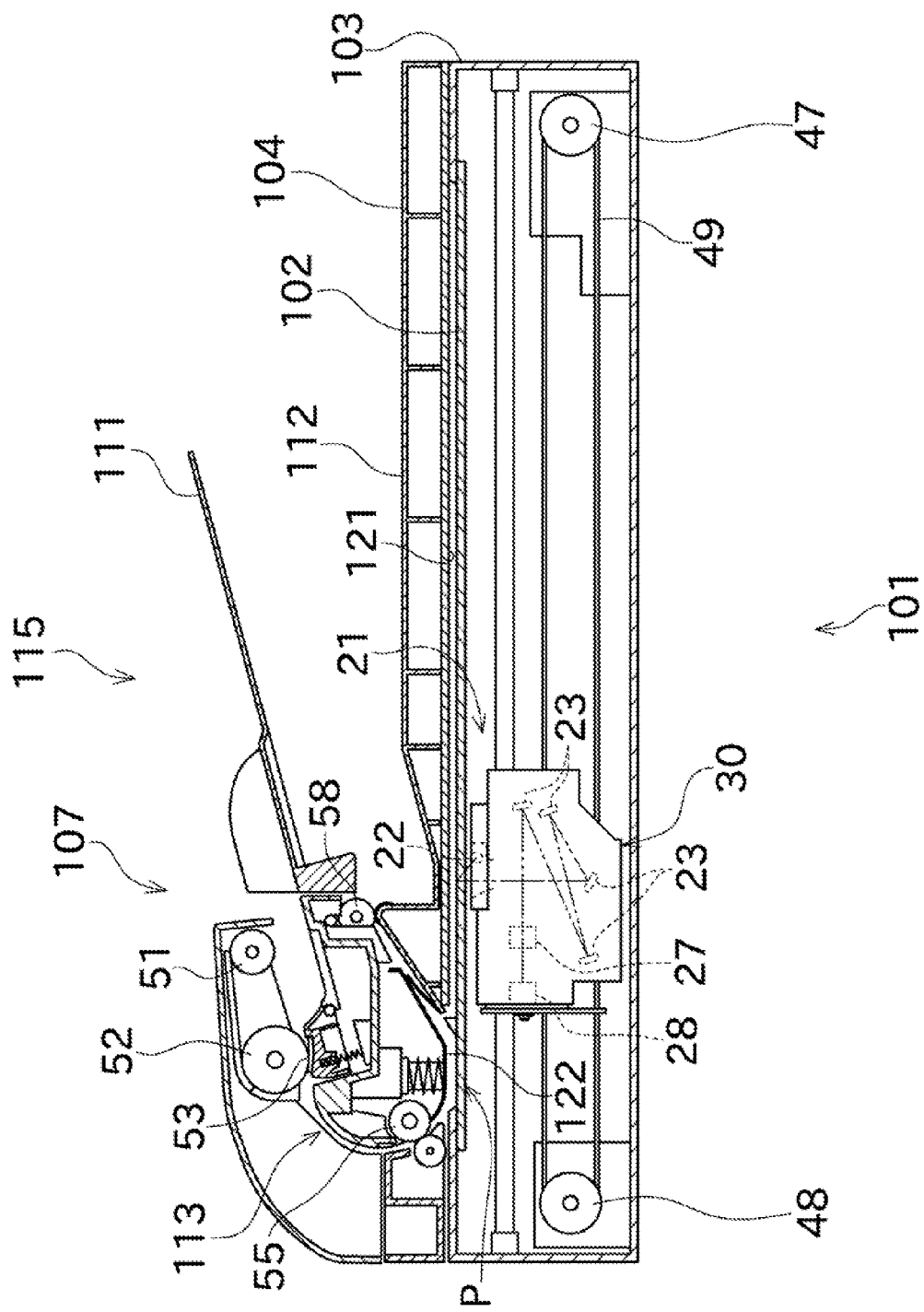
FIG. 2 is a front sectional view illustrating an entire configuration of an image scanner apparatus according to a preferred embodiment of the present invention.

Preferred embodiments of the present invention will now be described. FIG. 2 is a front sectional view illustrating an entire configuration of an image scanner apparatus according to a preferred embodiment of the present invention.

As illustrated in FIG. 2, an image scanner apparatus 101 defining an image scanning apparatus includes an image scanning unit 115 having an Auto Document Feeder (ADF) unit and a flat bed unit.

A more detailed description of the image scanner apparatus 101 will be provided below. The image scanner apparatus 101 includes an original document table 103 having a platen glass 102 on which an original document is placed, and an original document table cover 104 arranged to maintain the original document such that the document is pressed against the platen glass. The image scanner apparatus 101 also includes an operation panel (not illustrated) to commence the start of original document scanning or the like. A pressing pad 121 that presses the original document downward is preferably attached to a lower surface of the original document table cover 104 such that the pad 121 opposes the platen glass 102.

The original document table cover 104 preferably includes an ADF device 107. The ADF device 107 preferably includes an original document tray 111 arranged on an upper portion of the original document table cover 104 and a discharge tray 112 arranged below the original document tray 111.

As illustrated in FIG. 2, a curved original document transportation path 113 that links the original document tray 111 to the discharge tray 112 is preferably arranged inside the original document table cover 104. The original document transportation path 113 preferably includes a pick up roller 51, a separation roller 52, a separation pad 53, a transportation roller 55, and a discharge roller 58.

The pick up roller 51 picks up the original document placed on the original document tray 111, and the separation roller 52 and the separation pad 53 separate the picked up original document one sheet at a time. The transportation roller 55 transports the separated original document to an original document scanning position P, and the discharge roller 58 discharges the scanned original document onto the discharge tray 112. A pressing member 122 facing the platen glass is preferably arranged at the original document scanning position P.

In the above-described configuration, the original documents stacked and placed on the original document tray 111 are separated one sheet at a time and transported along the curved original document transportation path 113. Then, after the original document passes through the original document scanning position P and is scanned by a scanner unit 21, which will be described below, the document is discharged onto the discharge tray 112.

As illustrated in FIG. 2, the scanner unit 21 is preferably arranged inside the original document table 103. The scanner unit 21 includes a carriage 30 that is movable inside the original document table 103.

The carriage 30 preferably includes a lamp 22 as a light source, reflection mirrors 23, a condenser lens 27, and a Charge Coupled Device (CCD) 28. The lamp 22 irradiates light to the original document. After the light reflected from the original document is reflected by the plurality of reflection mirrors 23, the light passes through the condenser lens 27, converges, and forms an image on a front surface of the CCD 28. The CCD 28 converts the irradiated and converged light into an electrical signal and outputs the signal.

In the present preferred embodiment of the present invention, the CCD 28 is preferably a 3-line color CCD. The CCD 28 includes a one-dimensional line sensor with respect to each color of Red, Green, and Blue (RGB). Each of the line sensors extends in a main scanning direction (i.e., a width direction of an original document). The CCD 28 also preferably includes different color filters that correspond to each line sensor.

A driving pulley 47 and a driven pulley 48 are preferably rotationally supported inside the original document table 103. An endless drive belt 49 is preferably arranged between the driving pulley 47 and the driven pulley 48 in a tensioned state. The carriage 30 is fixed to a proper position of the drive belt 49. In this configuration, by driving the driving pulley 47 in a forward and rearward direction by using an electric motor (not illustrated), the carriage 30 can travel horizontally along a sub scanning direction.

In the above-described configuration, when the carriage 30 is placed in advance of a position that corresponds to the original document scanning position P, the ADF 107 is driven. Accordingly, the original document to be transported in the original document transportation path 113 is scanned at the original document scanning position P. The reflection light, which is irradiated from the lamp 22 and reflected by the original document, is introduced into the carriage 30, directed to the CCD 28 by the reflection mirrors 23 via the condenser lens 27, and forms an image. Thus, the CCD 28 can output an electrical signal that corresponds to the scanned content.

When using a flat bed scanner, while the carriage 30 is moved at a prescribed speed along the platen glass 102, an original document placed on the platen glass 102 can be scanned. Reflected light from the original document is similarly introduced into the CCD 28 of the carriage 30 and forms an image.

Figure 3:
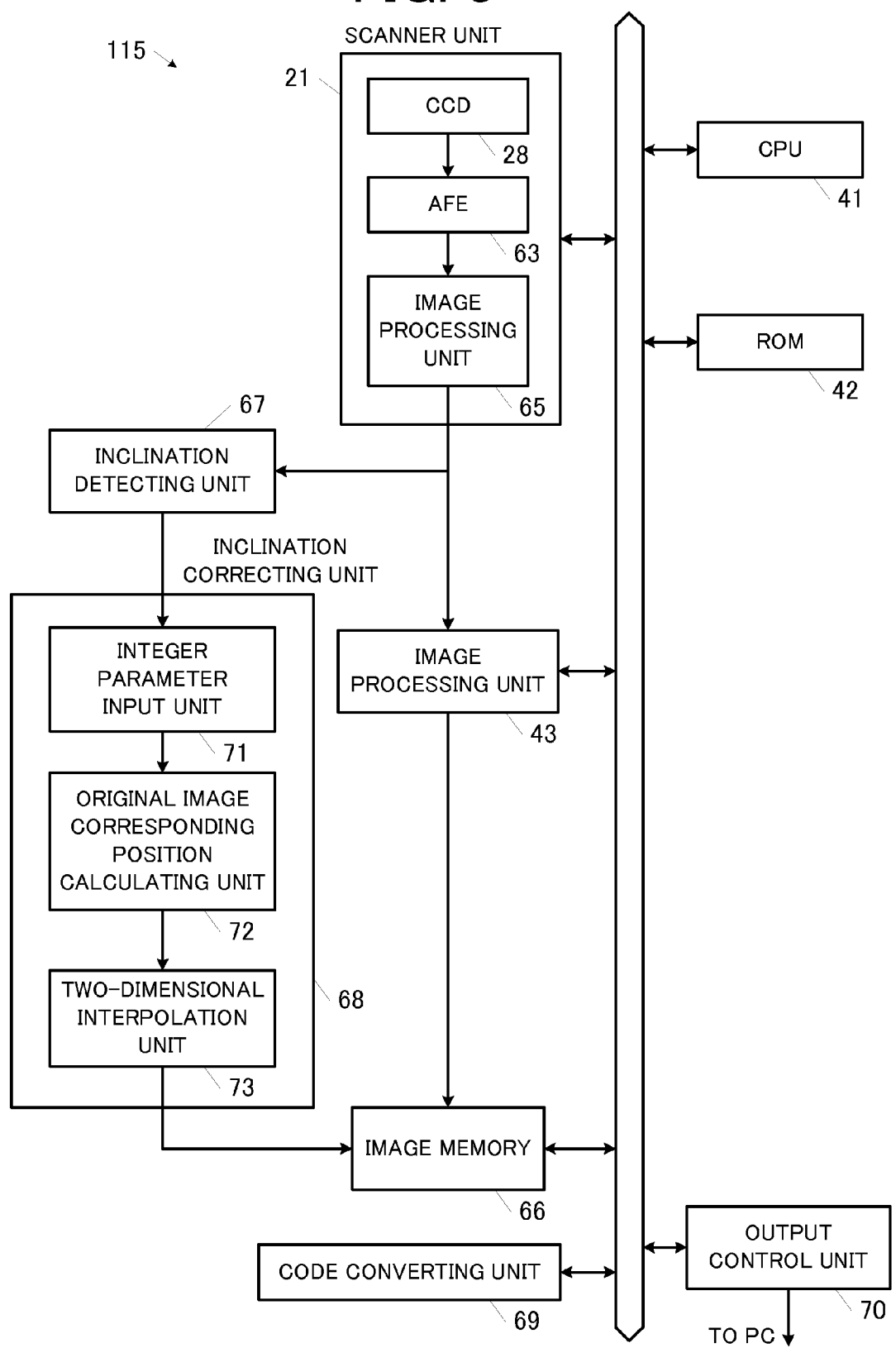
FIG. 3 is a block diagram illustrating an electrical configuration of the image scanner apparatus.

FIG. 3 is a block diagram of the image scanner apparatus 101. As illustrated in FIG. 3, in addition to the scanner unit 21, the image scanner apparatus 101 preferably includes a Central Processing Unit (CPU) 41, a Read Only Memory (ROM) 42, an image processing unit 43, an image memory 66, an inclination detecting unit 67, an inclination correcting unit 68, a code converting unit 69, and an output control unit 70.

The CPU 41 functions as a control unit that controls, for example, the scanner unit 21, the inclination detecting unit 67, the inclination correcting unit 68, and the output control unit 70 which are included in the image scanner apparatus 101. Programs and data, or the like, for the control are stored in the ROM 42 which defines a storage unit.

The scanner unit 21 preferably includes an Analog Front End (AFE) 63. The AFE 63 is connected with the CCD 28. At the time of scanning the original document, the line sensor of each color of RGB included in the CCD 28 scans one line of the original document content by scanning in the main scanning direction, and the signal of each line sensor is converted from an analog signal into a digital signal by the AFE 63. By this main scanning, pixel data of one line is output as a tone value of each color of RGB from the AFE 63. By repeating the above-described process while the original document is being transported or the carriage 30 is moved in the sub scanning direction, image data of the entire original document can be acquired as digital signals.

The scanner unit 21 preferably includes an image processing unit 65, and the digital signals of the image data output from the AFE 63 are input into the image processing unit 65. The image processing unit 65 preferably performs shading correction on the pixel data input line-by-line with respect to each main scanning, and corrects scanned unevenness that arises from an optical system of the scanner unit 21. The image processing unit 65 preferably performs, on the pixel data, a correction that corrects color shift caused by line gaps of the line sensor of each color of RGB in the CCD 28.

The image memory 66 stores images scanned by the scanner unit 21. After well-known image processing (such as filter processing) is performed in the image processing unit 43, the image data scanned by the scanner unit 21 is input into the image memory 66 where it is accumulated.

The inclination detecting unit 67 analyzes the image data input by the scanner unit 21, detects an area of the original document, and based on this, automatically detects inclination (i.e., an angle to be rotated to correct the inclination) of the original document.

More specifically, the inclination detecting unit 67 performs the following process. In the present preferred embodiment, a white sheet (i.e., a platen sheet) that is preferably brighter than a normal sheet of paper is attached to a front surface of the pressing pad 121 and the pressing member 122 (FIG. 2) both arranged on a reverse side of the original document to be scanned. Accordingly, in the image data scanned by the CCD 28, a background portion of a surrounding area of the original document preferably has a higher luminance.

Thus, the inclination detecting unit 67 performs image processing that calculates luminance (Y component) from RGB components of the pixel data in accordance with a commonly known formula. When the calculated luminance is greater than or equal to a prescribed value, a binarization process that determines the pixel as a background pixel is performed, and when the calculated luminance is below the prescribed value, a binarization process that determines the pixel as an original document pixel is performed.

Figure 4:
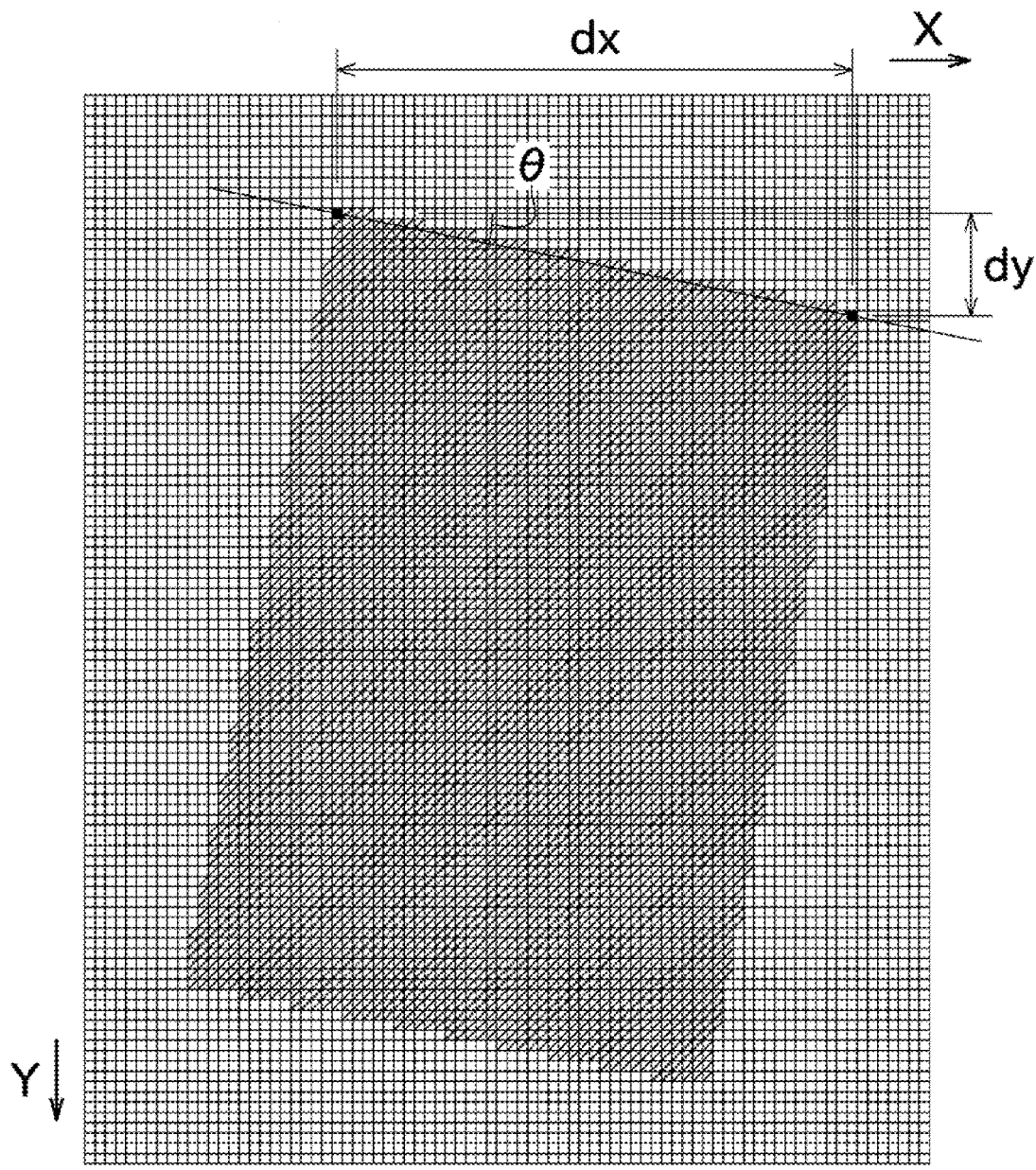
FIG. 4 represents two inclination integer parameters "a" and "b" detected by an inclination detecting unit.

FIG. 4 illustrates an example of a binarized image. In FIG. 4, each finely separated grid indicates one pixel, each blank grid indicates the background pixel, and each shaded grid indicates the original document pixel.

In the example of FIG. 4, the original document is transported to the ADF unit in an inclined state and scanned by the scanner unit 21. As a result, a rectangular image that is slightly rotated in a clockwise direction, for example, from a proper (normal) direction is acquired as an original document pixel area.

In a preferred embodiment of the present invention, the inclination detecting unit 67 detects, by a proper image recognition process, two points (refer to the blackened grids) that are positioned at corner portions of the original document pixel area. Then, the x-coordinates and y-coordinates of the two detected points are respectively acquired, and the difference between the x-coordinates and the difference between the y-coordinates of the two points are calculated and acquired. The acquired difference between the y-coordinates is "dy", and the acquired difference between the x-coordinates is "dx". In the example of FIG. 4, "dy=10", and "dx=50".

Then, the inclination detecting unit 67 divides the difference "dy" of the y-coordinates and the difference "dx" of the x-coordinates by the greatest common factor, and sets the acquired results as inclination parameters "a" and "b". In the example of FIG. 4, "a=1", and "b=5".

Assuming that "θ" refers to an inclination angle of the original document, a relationship of the following formula is established: "$\theta = \tan^{-1}(dy/dx) = \tan^{-1}(a/b)$". In other words, a ratio value of "a" and "b" (i.e., "a/b") is equal to a tangent value "tan θ" of the inclination angle of the original document. The inclination detecting unit 67 in the present preferred embodiment only stores the inclination parameters "a" and "b" in the appropriate memory, and does not calculate the inclination angle "θ".

Since the x-coordinates and y-coordinates of the two points are represented as an integer, the above-described difference "dy" of the y-coordinates and the difference "dx" of x-coordinates are expressed as an integer, and the inclination parameters "a" and "b" are also expressed as an integer. The acquired inclination parameters "a" and "b", which are integers, are used as integer parameters that will be provided to the inclination correcting unit 68 to be described later.

A detecting process (an angle detecting process) of the above-described inclination parameters "a" and "b" may be performed without performing resolution conversion (variable power) of an original image, or may be performed by using reduced image data acquired by having the original image reduced. When processing by software, in particular, the period of time required for the angle detecting process can be shortened by using the reduced image data.

The inclination correcting unit 68 illustrated in FIG. 3 rotates raster image data stored in the image memory 66 based on the inclination parameter integers "a" and "b" acquired by the inclination detecting unit 67, and electronically corrects the inclination of the original document. The inclination correcting unit 68 includes an integer parameter input unit 71, an original image corresponding position calculating unit 72, and a two-dimensional interpolation unit 73.

The parameter input unit 71 can acquire two inclination integer parameters as a first integer parameter "a" and a second integer parameter "b". As described above, the ratio value ("a/b") of the two integer parameters "a" and "b" is equal to the tangent value "tan θ" of the angle (the inclination angle of the original document) by which the image should be rotated.

By performing a prescribed calculation based on a position of a target pixel (m, n) of a rotated image, the original image corresponding position calculating unit 72 acquires a position of a corresponding target pixel (i, j), which corresponds to the target pixel (m, n) in the original image. By performing the prescribed calculation based on the position of the target pixel, the original image corresponding position calculating unit 72 acquires an x-direction weighting factor "kwx" and a y-direction weighting factor "kwy" that are used for the interpolation performed by the two-dimensional interpolation unit 73.

Based on the corresponding target pixel (i, j) and three pixels each having at least one of the x-coordinate and the y-coordinate that are different from the corresponding target pixel, the two-dimensional interpolation unit 73 performs two-dimensional interpolation to acquire a pixel value "Q(m, n)" of the target pixel of the rotated image. In the two-dimensional interpolation, ratios ("kwx/b" and "kwy/b") acquired by respectively dividing the x-direction weighting factor "kwx" and the y-direction weighting factor "kwy" by the integer "b" are used. A rotation process by the inclination correcting unit 68 will be described later in detail.

The code converting unit 69 encodes the image data stored in the image memory 66 by performing a well-known compression process such as a Joint Photographic Experts Group (JPEG).

The output control unit 70 transmits the encoded image data to a computer such as a personal computer (not illustrated), for example, which defines a higher-level device connected with the image scanner apparatus 101. A transmission method may be selected and include, for example, a method that uses a Local Area Network (LAN) and/or a method that uses a Universal Serial Bus (USB).

In the present preferred embodiment of the present invention, the image processing unit 65, the inclination detecting unit 67, the inclination correcting unit 68, and the code converting unit 69 or the like are implemented preferably by using hardware such as Application Specific Integrated Circuits (ASIC) and a Field Programmable Gate Array (FPGA). When an image processing program that performs the image rotating process by a method described later is written in ASIC or the like, the inclination correcting unit 68 can implement a rotation processing function. However, the inclination correcting unit 68, etc., may be implemented by a combination of the CPU 41 and programs or the like.

The image rotating process by the inclination correcting unit 68 will be described with reference to the flowchart of FIG. 5.

Figure 5:
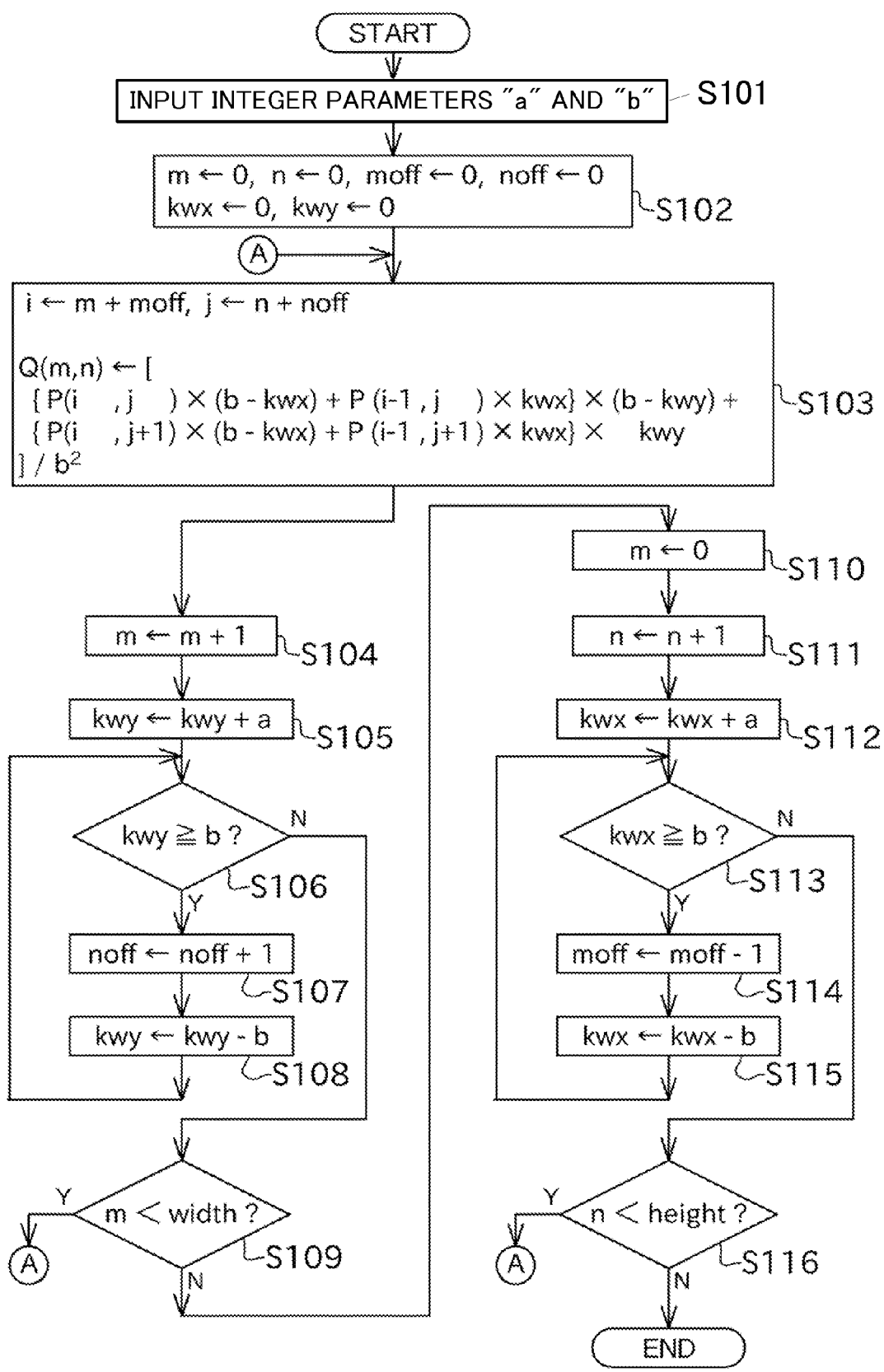
FIG. 5 is a flowchart illustrating a rotation process executed by an inclination correcting unit.

When the flow of FIG. 5 is started, firstly, the inclination correcting unit 68 inputs, as the first integer parameter "a" and the second integer parameter "b", the two inclination integer parameters acquired by the inclination detecting unit 67 (S101). The process of S101 corresponds to an integer parameter inputting step.

Then, an initialization process of variables is performed (S102). In the initialization process, the x-coordinate "m" and the y-coordinate "n" of the target pixel of the rotated image is reset to zero. Further, an x-direction offset value "moff" and a y-direction offset value "noff", which are used when the position of the corresponding target pixel (the original image pixel that corresponds to the target pixel) is calculated, are reset to zero. Furthermore, the x-direction weighting factor "kwx" and the y-direction weighting factor "kwy", which are used for the two-dimensional interpolation, are reset to zero. Each of the variables "m", "n", "moff", "noff", "kwx", and "kwy" is an integer variable.

Then, the pixel value "Q(m, n)" of the target pixel (m, n) of the rotated image is calculated (S103). In this process, firstly, the position (i, j) of the corresponding target pixel of the original image is calculated. The x-coordinate "i" of the corresponding target pixel can be acquired by adding the offset value "moff" to the x-coordinate "m" of the target pixel of the rotated image (i=m+moff). Similarly, the y-coordinate "j" of the corresponding target pixel can be acquired by adding the offset value "noff" to the y-coordinate "n" of the target pixel of the rotated image (j=n+noff).

Each time the target pixel of the rotated image moves by "b/a" pixels in the y-direction, one is subtracted from the offset value "moff" (S114). Each time the target pixel of the rotated image moves by "b/a" pixels in the x-direction, one is added to the offset value "noff" (S107). These addition/subtraction processes of the offset values will be described later.

FIG. 6 illustrates a correspondence between the target pixel of the rotated image and the corresponding target pixel of the original image represented when the inclination parameters "a=1" and "b=5" acquired in the example of FIG. 4 are input as the first integer parameter and the second integer parameter into the inclination correcting unit 68.

Assuming that the first row and first column of the rotated image are the target pixels, FIG. 6 illustrates the target pixels and the corresponding target pixels of the original image with the grids surrounded by double-lines. As illustrated in the upper portion of FIG. 6, each time the target pixel of the rotated image moves by five pixels (i.e., by "b/a" pixels) in the x-direction, the corresponding target pixel of the original image is displaced by one pixel in the y-direction. Each time the target pixel of the rotated image moves by five pixels in the y-direction, the corresponding target pixel of the original image is displaced by one pixel in the x-direction.

Next, the pixel value "Q(m, n)" of the target pixel of the rotated image is acquired by two-dimensional linear interpolation. As illustrated in FIG. 7, the two-dimensional linear interpolation uses four pixels: the corresponding target image (i, j) of the original image; the pixel (i−1, j) arranged next to the corresponding target pixel in the x-direction; the pixel (i, j+1) arranged next to the corresponding target pixel in the y-direction; and the pixel (i−1, j+1) arranged obliquely next to the corresponding target pixel. Based on each pixel value of these four pixels, that is, a pixel value P(i, j), a pixel value P(i−1, j), a pixel value P(i, j+1), and a pixel value P(i−1, j+1), by performing the linear interpolation by a ratio "kwx/b" acquired by dividing the x-direction weighting factor "kwx" by the second integer parameter "b", and a ratio "kwy/b" acquired by dividing the y-direction weighting factor "kwy" by the second integer parameter "b", the pixel value "Q(m, n)" of the target pixel (m, n) of the rotated image is acquired.

Each time the target pixel of the rotated image moves by one pixel in the y-direction, the first integer parameter "a" is added to the x-direction weighting factor "kwx" (S112 of FIG. 5). Each time the target pixel of the rotated image moves by one pixel in the x-direction, the first integer parameter "a" is added to the y-direction weighting factor "kwy" (S105). The addition process of the weighting factor will be described later.

S103 of FIG. 5 represents the formula of the pixel value "Q(m, n)" of the target pixel described in the schematic diagram of FIG. 7. The formula is changed such that the division by the second integer parameter "b" is outside the square brackets. Thus, the division process, which requires a substantial calculation cost and time, can be performed by one division by a square of the second integer parameter ("$b^2$"), thereby increasing the speed of the calculation process.

After the acquiring process (two-dimensional interpolation step) of the pixel value of S103 is completed, one is added to the x-coordinate "m" of the target pixel (S104). This process corresponds to the process in which the target pixel (m, n) of the rotated image moves by one pixel in the x-direction.

Next, the first integer parameter "a" is added to the y-direction weighting factor "kwy" (S105). Then, it is determined whether the y-direction weighting factor "kwy" after the addition is more than or equal to the second integer parameter "b" or not (S106). When the y-direction weighting factor "kwy" after the addition is more than or equal to the second integer parameter "b", one is added to the y-direction offset value "noff" (S107), and the second integer parameter "b" is subtracted from the y-direction weighting factor "kwy" (S108). Then, the process returns to S106.

When the y-direction weighting factor "kwy" is below the second integer parameter "b", the process proceeds to S109, where it is determined whether or not the x-coordinate "m" of the target pixel of the rotated image is below a value acquired by multiplying the width of the rotated image by a cosine value ("cos θ") of the inclination angle of the original document. When the x-coordinate "m" is below "width×cos θ", the process returns to S103.

By the above-described flow, while changing the x-coordinate "m" of the target pixel (m, n) of the rotated image one by one from zero to "width×cos θ−1", the process of calculating the pixel value "Q(m, n)" is repeated. Since "a" is added to the y-direction weighting factor "kwy" each time the x-coordinate "m" is changed by one (S105), in the two-dimensional interpolation performed at the time of calculation of the pixel value "Q(m, n)", a weight that reflects the two lower-side pixel values "P(i, j+1)" and "P(i−1, j+1)" is increased. The weight change ratio with respect to each time "m" is changed by one matches the value acquired by dividing "a" by "b". Further, when the y-direction weighting factor "kwy" becomes more than or equal to "b", one is added to the y-direction offset value "noff", meaning that the corresponding target pixel (i, j) of the original image is displaced by one pixel in the y-direction.

When it is determined in S109 that the x-coordinate "m" of the target pixel is more than or equal to "width×cos θ", each of the x-coordinate "m", the y-direction offset value "noff", and the y-direction weighting factor "kwy" is reset to zero (S110), and one is added to the y-coordinate "n" of the target pixel (S111). This process corresponds to the process in which the target pixel (m, n) of the rotated image is moved by one pixel in the y-direction.

Next, the first integer parameter "a" is added to the x-direction weighting factor "kwx" (S112). Then, it is determined whether or not the x-direction weighting factor "kwx" after the addition is more than or equal to the second integer parameter "B" (S113). When the x-direction weighting factor "kwx" after the addition is more than or equal to the second integer parameter "b", one is added to the x-direction offset value "moff" (S114), and the second integer parameter "b" is subtracted from the x-direction weighting factor "kwx" (S115). Then, the process returns to S113.

When the x-direction weighting factor "kwx" is below the second integer parameter "b", the process proceeds to S116, where it is determined whether or not the y-coordinate "n" of the target pixel of the rotated image is below a value acquired by multiplying the height of the rotated image by the cosine value (cos θ) of the inclination angle of the original document. When the y-coordinate "n" is below "height×cos θ", the process returns to S103. When the y-coordinate "n" is more than or equal to "height×cos θ", it means that the calculation of the pixel value of the target pixel is completed, and the process is ended.

By the above process, while changing the y-coordinate "n" of the target pixel (m, n) of the rotated image one by one from zero to "height×cos θ−1", the process of calculating the pixel value "Q(m, n)" is repeated. Since "a" is added to the x-direction weighting factor "kwx" each time the y-coordinate "n" is changed by one, in the two-dimensional interpolation performed at the time of calculation of the pixel value "Q(m, n)", a weight reflecting the two left-side pixel values "P(i−1, j)" and "P(i−1, j+1)" of FIG. 7 is increased. The weight change ratio with respect to each time "n" is changed by one matches the value acquired by dividing "a" by "b". Further, when the x-direction weighting factor "kwx" becomes more than or equal to "b", one is subtracted from the x-direction offset value "moff", meaning that the corresponding target pixel (i, j) of the original image is displaced by one pixel in the x-direction. The processes of S104 through S116 of FIG. 5 correspond to the original image corresponding position calculating step.

Thus, by performing the rotating process on a raster image of the original image illustrated in the upper portion of FIG. 8, the rotated image illustrated in the lower drawing can be acquired. In the two-dimensional interpolation process (S103) of the flow of FIG. 5, the formula inside the square brackets can be implemented by the addition and multiplication of integers, and the pixel value "Q(m, n)" of the target pixel can be acquired by performing only one division (division by the square of integer "b", i.e., division by "$b^2$"). The calculations of the weighting factors (S105, S108, S112, and S115) can be implemented by the addition/subtraction processes of integers, and the determinations (S106 and S113) as to whether or not the position of the corresponding target pixel should be offset can be implemented by a process of comparison between integers. Thus, the calculation cost can be substantially reduced, and the period of time required for the processes can also be reduced.

FIGS. 5 and 8 illustrate a situation in which the image is rotated in a counterclockwise direction, however, the image may be rotated in a clockwise direction. Such a process may be performed by changing, in the processes of S103, S107, and S114 of the flowchart of FIG. 5, from "−1" to "+1" and from "+1" to "−1".

In order to simplify the description, a relatively small image of 18 pixels in height by 18 pixels in width is used in FIGS. 6 and 8, however, the rotating process of the present preferred embodiment can be applied to any image of any size. Further, FIGS. 6 and 8 illustrate the example of a gray scale image, however, the rotating process of the present preferred embodiment can be applied to the rotation of a color image by performing a process similar to the above with respect to the tone of each color of RGB. When rotating the color image, it is preferable that after a weighting factor common to three components is generated with respect to each pixel, the interpolation calculation is sequentially performed with respect to each color component. In other words, it is preferable to select a color component with respect to each pixel. Thus, the process of calculating the weighting factor can be commoditized among the color components, thereby reducing the period of time required for the processes.

As described above, the inclination correcting unit 68 of the image scanner apparatus 101 of the present preferred embodiment can acquire the rotated image by rotating the raster image, which corresponds to the original image. As illustrated in FIG. 3, the inclination correcting unit 68 includes the integer parameter input unit 71, the original image corresponding position calculating unit 72, and the two-dimensional interpolation unit 73. The first integer parameter "a" and the second integer parameter "b" of which the ratio value ("a/b") equals to the tangent value "tan θ" of the rotation angle are input into the parameter input unit 71. Each time the x-coordinate "m" of the target pixel (m, n) of the rotated image is changed by one pixel, the original image corresponding position calculating unit 72 adds the first integer parameter "a" to the y-direction weighting factor "kwy" (S104 and S105). When the y-direction weighting factor "kwy" becomes more than or equal to the second integer parameter "b", the original image corresponding position calculating unit 72 subtracts the second integer parameter "b" from the y-direction weighting factor "kwy" (S108), and further, changes, by one pixel, the x-coordinate "i" of the corresponding target pixel (i, j), which corresponds in the original image to the target pixel (m, n) (S107). Moreover, each time the y-coordinate "n" of the target pixel (m, n) of the rotated image is changed by one pixel, the original image corresponding position calculating unit 72 adds the first integer parameter "a" to the x-direction weighting factor "kwx" (S111 and S112). When the y-direction weighting factor "kwy" becomes more than or equal to the second integer parameter "b", the original image corresponding position calculating unit 72 subtracts the second integer parameter "b" from the x-direction weighting factor "kwx" (S115), and changes, by one pixel, the y-coordinate "j" of the corresponding target pixel (i, j) of the original image (S114). Further, as illustrated in FIG. 7, with respect to the corresponding target pixel (i, j) of the original image and three pixels each having at least one of the x-coordinate and the y-coordinate that are different, by one pixel, from the corresponding target pixel, i.e., with respect to the corresponding target pixel (i, j) and the three pixels (i−1, j), (i, j+1), and (i−1, j+1), the two-dimensional interpolation is performed by the ratio ("kwx/b") acquired by dividing the x-direction weighting factor by the second integer parameter and by the ratio ("kwy/b") acquired by dividing the y-direction weighting factor by the second integer parameter. Thus, the pixel value "Q(m, n)" of the target pixel of the rotated image is acquired.

Accordingly, the rotating process including the two-dimensional interpolation can be performed by performing the integer calculating process and the integer comparison process using the integer parameters "a", "b" and the weighting factors "kwx" and "kwy". Thus, processes that require a substantial calculation cost and time, such as a floating-point calculation, can be reduced, and a high-quality rotated image can be acquired at a high speed.

In the case of the image scanner apparatus 101 of the present preferred embodiment, in either case in which the original document is scanned by using the ADF unit or by using the flat bed unit, the inclination angle "θ" (the angle to be rotated by) of the original document is only few degrees. In such a case, assuming that "cos θ=1", the difference (image quality deterioration) is small. By taking this respect into consideration and performing the above-described processes, the present preferred embodiment can substantially simplify the calculations. When the inclination of the original document is a few degrees as described above, high accuracy can be maintained, and complicated processes required in the conventional art can be omitted.

Further, in the calculation (S103 of FIG. 5) of the pixel value "Q(m, n)" of the target pixel, the two-dimensional interpolation unit 73 collectively performs the division by the square of the second integer parameter ("$b^2$").

Thus, since the dividing process, which requires a substantial calculation cost, can be reduced, the rotating process can be performed at higher speed.

The calculation process (S103) of the pixel value "Q(m, n)" of the target pixel may be performed by changing the second integer parameter "b" to a value of two to the power of the integer by multiplying the second integer parameter "b" by a proper ratio, and by multiplying the x-direction weighting factor "kwx" and the y-direction weighting factor "kwy" by the ratio so as to approximate an integer value. For example, the "a=1" and "b=5" in the example of FIG. 4, however, by multiplying the second integer parameter "b" by a ratio of "16/5", the second integer parameter "b" may be changed to "16", which is acquired by raising two to the fourth power. Then, it is preferable to perform the calculation process of the pixel value "Q(m, n)" by multiplying the x-direction weighting factor "kwx" and the y-direction weighting factor "kwy" by the ratio of "16/5" so as to approximate the integer value. The value approximated to the integer value by multiplying the weighting factors "kwx" and "kwy" by the ratio may be calculated in advance with respect to each case in which the initial "kwx" (or "kwy") value is zero, one, two, etc., stored in a look-up table or the like, and acquired by referencing the table.

Thus, since the calculation cost and time of the division process can be substantially reduced, the rotating process can be performed at a higher speed.

As illustrated in FIG. 3, the image scanner apparatus 101 of the present preferred embodiment includes the image scanning unit 115 and the inclination detecting unit 67. The image scanning unit 115 scans an image of an original document to acquire image data. The inclination detecting unit 67 acquires, from the coordinates of two points of the image data, two inclination integer parameters "a" and "b" of which a ratio value equals to a tangent value "tan θ" of an inclination angle of the original document. Then, the image scanner apparatus 101 provides the inclination correcting unit 68 with the inclination parameters "a" and "b", which are integers, as the integer parameters, performs the rotating process of the image data, and thus acquires image data having the corrected inclination of the original document.

Accordingly, since the image data having the corrected inclination can be acquired in a short period of time, it is particularly preferable for high-speed scanning.

The preferred embodiments of the present invention and modifications thereof have been described above, however, the above-described configuration may be modified as follows.

When the inclination angle "θ" is below 45 degrees (i.e., when "a/b" is below one), the process may proceed to S109 after the process of S108 without returning to S106. Similarly, after the process of S115, the process may proceed to S116 without returning to S113. Thus, the rotating process can be performed at higher speed. In the image scanner apparatus 101 of the present preferred embodiment, since it is not assumed that the original document is rotated by more than or equal to 45 degrees in normal usage, the above-described modification is effective.

The value added to the y-direction weighting factor "kwy" in the process of S105 and the value added to the x-direction weighting factor "kwx" in the process of S112 may not be the parameter "a", and may be changed to a value that is based on a variable magnification. Similarly, the value subtracted from the y-direction weighting factor "kwy" in the process of S108 and the value subtracted from the x-direction weighting factor "kwx" in the process of S115 may not be the parameter "b", and may be changed to the value that is based on the variable magnification. Thus, an enlargement/reduction process can be performed along with the inclination correction. Assuming that the variable magnification is "X", "a/X" may be added to the weighting factor in the processes of S105 and S112, and "b/X" may be subtracted from the weighting factor in the processes of S108 and S115. For example, when performing a reduction by 50% (X=½), "2a", not "a", is added in the processes of S105 and S112, and "2b", not "b", is subtracted in the processes of S108 and S115.

FIGS. 5 through 8 describe the example of the rotation process in which the rotation center of the original image is (0, 0), however, the position of the rotation center may be properly modified. In such a case, initial values of the offset values "moff" and "noff" in the initialization process (S102) and a reset value of "noff" in S110 of the flow of FIG. 5 may be properly set in accordance with the position of the rotation center.

In place of the above-described linear interpolation, the two-dimensional interpolation process may be modified to two-dimensional interpolation by a quadratic curve or a spline curve, for example.

Instead of detecting by extracting the original document area as described in FIG. 4, the inclination angle detecting process may be modified such that the inclination parameters "a" and "b", which are integers, are acquired based on an inclination of a character sequence and graphics in the original document, for example.

In addition to the inclination correction performed at the time of original document scanning by the ADF unit, the image rotating process may be performed to correct the inclination at the time of original document scanning by the flat bed unit. The above-described image rotating process may be applied not only to the image scanner apparatus 101 but also to other image scanning apparatuses such as a copier, a facsimile machine, a Multi Functional Peripheral, an OCR, or the like.

While the present invention has been described with respect to preferred embodiments thereof, it will be apparent to those skilled in the art that the disclosed invention may be modified in numerous ways and may assume many embodiments other than those specifically set out and described above. Accordingly, the appended claims are intended to cover all modifications of the present invention that fall within the true spirit and scope of the present invention.

What is claimed is:

1. An image processing apparatus arranged to acquire a rotated image by performing a process of rotating a raster image, which corresponds to an original image, comprising:

an integer parameter input unit to which a first integer parameter and a second integer parameter having a ratio value that is equal to a tangent value of a rotation angle are input;

an original image corresponding position calculating unit arranged to perform:
a process of adding the first integer parameter to a y-direction weighting factor each time an x-coordinate of a target pixel of the rotated image is changed by prescribed pixels;
processes of subtracting the second integer parameter from the y-direction weighting factor and changing by prescribed pixels a y-coordinate of a corresponding target pixel, which corresponds to the target pixel in the original image, when the y-direction weighting factor becomes more than or equal to the second integer parameter;
a process of adding the first integer parameter to an x-direction weighting factor each time a y-coordinate of the target pixel of the rotated image is changed by prescribed pixels; and
processes of subtracting the second integer parameter from the x-direction weighting factor and changing by prescribed pixels an x-coordinate of the corresponding target pixel of the original image when the x-direction weighting factor becomes more than or equal to the second integer parameter; and
a two-dimensional interpolation unit arranged to use the corresponding target pixel of the original image and three pixels each having at least one of the x-coordinate and the y-coordinate that are different by prescribed pixels from the corresponding target pixel, so as to acquire a pixel value of the target pixel of the rotated image by performing two-dimensional interpolation by a ratio acquired by dividing the x-direction weighting factor by the second integer parameter and a ratio acquired by dividing the y-direction weighting factor by the second integer parameter.

2. The image processing apparatus according to claim 1, wherein in a calculation of the pixel value of the target pixel, the two-dimensional interpolation unit is arranged to collectively perform the division by a square of the second integer parameter.

3. The image processing apparatus according to claim 1, wherein the two-dimensional interpolation unit is arranged to change the second integer parameter to a value of two to the power of the integer, further, to multiply the x-direction weighting factor and the y-direction weighting factor by a ratio acquired by dividing the value of two to the power of the integer by the not-yet changed second integer parameter, so as to approximate an integer value, and then to calculate the pixel value of the target pixel.

4. An image scanning apparatus arranged to acquire image data having a corrected inclination of an original document, comprising:
an image processing apparatus arranged to acquire a rotated image by performing a process of rotating a raster image, which corresponds to an original image;
an image scanning unit arranged to acquire image data by scanning an image of the original document;
an inclination angle detecting unit arranged to acquire, from the coordinates of two points in the image data, two inclination integer parameters having a ratio value that is equal to a tangent value of an inclination angle of the original document;
the image processing apparatus including an integer parameter input unit to which the two inclination integer parameters are provided as a first integer parameter and a second integer parameter;
an original image corresponding position calculating unit arranged to perform:
a process of adding the first integer parameter to a y-direction weighting factor each time an x-coordinate of a target pixel of the rotated image is changed by prescribed pixels;
processes of subtracting the second integer parameter from the y-direction weighting factor and changing by prescribed pixels a y-coordinate of a corresponding target pixel, which corresponds to the target pixel in the original image, when the y-direction weighting factor becomes more than or equal to the second integer parameter;
a process of adding the first integer parameter to an x-direction weighting factor each time a y-coordinate of the target pixel of the rotated image is changed by prescribed pixels; and
processes of subtracting the second integer parameter from the x-direction weighting factor and changing by prescribed pixels an x-coordinate of the corresponding target pixel of the original image when the x-direction weighting factor becomes more than or equal to the second integer parameter; and
a two-dimensional interpolation unit arranged to use the corresponding target pixel of the original image and three pixels each having at least one of the x-coordinate and the y-coordinate that are different by prescribed pixels from the corresponding target pixel, so as to acquire a pixel value of the target pixel of the rotated image by performing two-dimensional interpolation by a ratio acquired by dividing the x-direction weighting factor by the second integer parameter and a ratio acquired by dividing the y-direction weighting factor by the second integer parameter.

5. The image scanning apparatus according to claim 4, wherein in a calculation of the pixel value of the target pixel, the two-dimensional interpolation unit is arranged to collectively perform the division by a square of the second integer parameter.

6. The image scanning apparatus according to claim 4, wherein the two-dimensional interpolation unit is arranged to change the second integer parameter to a value of two to the power of the integer, further, to multiply the x-direction weighting factor and the y-direction weighting factor by a ratio acquired by dividing the value of two to the power of the integer by the not-yet changed second integer parameter, so as to approximate an integer value, and then to calculate the pixel value of the target pixel.

7. An image processing method that acquires a rotated image by performing a process of rotating a raster image, which corresponds to an original image, comprising:
an integer parameter inputting step arranged to input a first integer parameter and a second integer parameter having a ratio value that is equal to a tangent value of a rotation angle;
an original image corresponding position calculating step arranged to perform:
a process of adding the first integer parameter to a y-direction weighting factor each time an x-coordinate of a target pixel of the rotated image is changed by prescribed pixels;
processes of subtracting the second integer parameter from the y-direction weighting factor and changing by prescribed pixels a y-coordinate of a corresponding target pixel, which corresponds to the target pixel in the original image, when the y-direction weighting factor becomes more than or equal to the second integer parameter;

a process of adding the first integer parameter to an x-direction weighting factor each time a y-coordinate of the target pixel of the rotated image is changed by prescribed pixels; and processes of subtracting the second integer parameter from the x-direction weighting factor and changing by prescribed pixels an x-coordinate of the corresponding target pixel of the original image when the x-direction weighting factor becomes more than or equal to the second integer parameter; and a two-dimensional interpolation step arranged to use the corresponding target pixel of the original image and three pixels each having at least one of the x-coordinate and the y-coordinate that are different by prescribed pixels from the corresponding target pixel, so as to acquire a pixel value of the target pixel of the rotated image by performing two-dimensional interpolation by a ratio acquired by dividing the x-direction weighting factor by the second integer parameter and a ratio acquired by dividing the y-direction weighting factor by the second integer parameter.

8. The image processing method according to claim 7, wherein in a calculation of the pixel value of the target pixel, the two-dimensional interpolation step collectively performs the division by a square of the second integer parameter.

9. The image processing method according to claim 7, wherein the two-dimensional interpolation step changes the second integer parameter to a value of two to the power of the integer, further, multiplies the x-direction weighting factor and the y-direction weighting factor by a ratio acquired by dividing the value of two to the power of the integer by the not-yet changed second integer parameter, so as to approximate an integer value, and then calculates the pixel value of the target pixel.

10. A computer-readable recording medium in which an image processing program arranged to acquire a rotated image by performing a process of rotating a raster image, which corresponds to an original image, is recorded, wherein when the image processing program is run a computer, the image processing program instructs the computer to execute:

an integer parameter inputting step arranged to input a first integer parameter and a second integer parameter having a ratio value that is equal to a tangent value of a rotation angle;

an original image corresponding position calculating step arranged to perform:

a process of adding the first integer parameter to a y-direction weighting factor each time an x-coordinate of a target pixel of the rotated image is changed by prescribed pixels;

processes of subtracting the second integer parameter from the y-direction weighting factor and changing by prescribed pixels a y-coordinate of a corresponding target pixel, which corresponds to the target pixel in the original image, when the y-direction weighting factor becomes more than or equal to the second integer parameter;

a process of adding the first integer parameter to an x-direction weighting factor each time a y-coordinate of the target pixel of the rotated image is changed by prescribed pixels; and processes of subtracting the second integer parameter from the x-direction weighting factor and changing by prescribed pixels an x-coordinate of the corresponding target pixel of the original image when the x-direction weighting factor becomes more than or equal to the second integer parameter; and a two-dimensional interpolation step arranged to use the corresponding target pixel of the original image and three pixels each having at least one of the x-coordinate and the y-coordinate that are different by prescribed pixels from the corresponding target pixel, so as to acquire a pixel value of the target pixel of the rotated image by performing two-dimensional interpolation by a ratio acquired by dividing the x-direction weighting factor by the second integer parameter and a ratio acquired by dividing the y-direction weighting factor by the second integer parameter.

11. The computer-readable recording medium according to claim 10, wherein in a calculation of the pixel value of the target pixel, the two-dimensional interpolation step collectively performs the division by a square of the second integer parameter.

12. The computer-readable recording medium according to claim 10, wherein the two-dimensional interpolation step changes the second integer parameter to a value of two to the power of the integer, further, multiplies the x-direction weighting factor and the y-direction weighting factor by a ratio acquired by dividing the value of two to the power of the integer by the not-yet changed second integer parameter, so as to approximate an integer value, and then calculates the pixel value of the target pixel.

* * * * *